United States Patent
Zamir et al.

(10) Patent No.: US 11,170,274 B2
(45) Date of Patent: Nov. 9, 2021

(54) GENERATING RASTERIZED MODIFIED IMAGES FROM A RASTERIZED SEED IMAGE

(71) Applicant: HP Indigo B.V., Amstelveen (NL)

(72) Inventors: Raz Zamir, Ness Ziona (IL); Noam Shaham, Ness Ziona (IL); Amir Gaash, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/606,760

(22) PCT Filed: Aug. 31, 2017

(86) PCT No.: PCT/EP2017/071920
§ 371 (c)(1),
(2) Date: Oct. 20, 2019

(87) PCT Pub. No.: WO2019/042558
PCT Pub. Date: Mar. 7, 2019

(65) Prior Publication Data
US 2020/0193248 A1    Jun. 18, 2020

(51) Int. Cl.
*G06K 15/02* (2006.01)
(52) U.S. Cl.
CPC ..... *G06K 15/1836* (2013.01); *G06K 15/1842* (2013.01); *G06K 15/1861* (2013.01); *G06K 15/1878* (2013.01); *G06K 15/1885* (2013.01)
(58) Field of Classification Search
CPC .......... G06K 15/1836; G06K 15/1878; G06K 15/1889; G06F 3/1243
See application file for complete search history.

(56) References Cited

U.S. PATENT DOCUMENTS

| | | | |
|---|---|---|---|
| 4,763,280 A | 8/1988 | Robinson et al. | |
| 5,206,719 A | 4/1993 | Ikeda et al. | |
| 6,055,067 A * | 4/2000 | Matsuda | G03G 15/221 358/404 |
| 6,330,071 B1 | 12/2001 | Vidyanand | |
| 7,069,270 B1 * | 6/2006 | Kumar | G06F 9/44505 |
| 2002/0051230 A1 * | 5/2002 | Ohta | H04N 1/46 358/448 |
| 2003/0038974 A1 * | 2/2003 | Hu | B41M 3/14 358/3.06 |

(Continued)

FOREIGN PATENT DOCUMENTS

| | | |
|---|---|---|
| WO | WO-9917539 A1 | 4/1999 |
| WO | WO-2015185135 A1 | 12/2015 |

OTHER PUBLICATIONS

Labels and Packaging Workflow Solutions, Jul. 7, 2016.

(Continued)

*Primary Examiner* — King Y Poon
*Assistant Examiner* — Michael Burleson
(74) *Attorney, Agent, or Firm* — Mannava & Kang (57) ABSTRACT

In an example, a method includes rasterizing a seed image using a processor. A plurality of rasterized modified images may be generated from the rasterized seed image. Generating each rasterized modified image may include determining an image attribute modification and applying the determined image attribute modification to at least a portion of the rasterized seed image to generate the rasterized modified image.

17 Claims, 4 Drawing Sheets

(56) References Cited

U.S. PATENT DOCUMENTS

| | | | |
|---|---|---|---|
| 2005/0273470 A1 | 12/2005 | Heigold | |
| 2006/0262335 A1* | 11/2006 | Varga | G06F 3/1275 358/1.13 |
| 2008/0030750 A1* | 2/2008 | Kato | G03G 15/5087 358/1.4 |
| 2011/0044535 A1* | 2/2011 | Stevens | H04N 1/3871 382/162 |
| 2013/0128305 A1* | 5/2013 | Grabkowitz | H04N 1/00973 358/1.15 |
| 2014/0075335 A1* | 3/2014 | Hicks | G06Q 10/10 715/753 |
| 2015/0062644 A1* | 3/2015 | Ishii | G06F 3/1204 358/1.15 |
| 2016/0065789 A1* | 3/2016 | Kamei | H04N 1/00339 358/2.1 |
| 2017/0206040 A1* | 7/2017 | Gaash | G06F 3/1204 |

OTHER PUBLICATIONS

On-the-fly Processing and Dynamic Raster Mosaicking Mosaic Datasets Resolve Many Traditional Raster Management Issues by Colin Childs, ESRI Education Services, 2010.

* cited by examiner

GENERATING RASTERIZED MODIFIED IMAGES FROM A RASTERIZED SEED IMAGE

BACKGROUND

In printing, print agents such as inks, toners, coatings and the like may be applied to a substrate. Substrates may in principle comprise any material, for example comprising paper, card, plastics, fabrics or the like. In some examples, the substrate may comprise or be formed as packaging.

BRIEF DESCRIPTION OF DRAWINGS

Non-limiting examples will now be described with reference to the accompanying drawings, in which.

DETAILED DESCRIPTION

In some circumstances, it may be intended to provide multiple images which, while different, have a degree of consistency or commonality. For example, product packaging may be varied while retaining a generally consistent look and feel. Many items are packaged before sale to consumers. In some cases, the packaging may be intended to remain with the item when it is in use. For example, beverages may be consumed or served direct from the bottles that act as the packaging for the beverage. In other cases, the packaging may be discarded without affecting the use of the product. For example, electronic devices may be sold in boxes made of folded cardboard for protection, but the box may not be retained after the device has been purchased. Packaging may include images intended to attract the consumers, and variations in this packaging may enhance this attraction.

Packaging provides just one example however. In other examples, the attraction of print media such as magazines, newspapers, posters, and the like may be enhanced by including variations between instances thereof.

While 2D printing to a substrate is discussed in detail in the examples below, the principles set out herein may be applied to 3D printing, or additive manufacturing, wherein an object to be generated may be modified, for example in terms of appearance (e.g. surface decoration) and/or shape, based on the principles set out below.

In examples set out below, a seed image is used to produce a number of modified images. By using a common seed image, an element of consistency between the modified images may be provided. However, as is explained in greater detail below, rather than generating a plurality of modified images for printing which are subsequently rasterized, in examples herein, the seed image is rasterized and modifications of this rasterized seed image are used to produce rasterized modified images.

The process of rasterization describes converting an image expressed in one form (for example in a vector graphics format) into pixels or dots for output on a video display or printer. By modifying rasterized images, this means that the modified images do not have to be stored and subsequently rasterized prior to printing. In some examples, an image may be divided into separations corresponding to colors as part of, or before or after, rasterization. Generally, rasterized images are created immediately prior to use, for example, being held in short-term volatile memory (which may also be referred to as active memory, primary computer memory, or RAM, depending on context) for as long as is suggested by the context. Thus, rather than generating the modified image and storing this in longer term memory (for example, non-volatile, or secondary, computer memory), the modified rasterized images may be created and printed 'on-the-fly', using volatile, or primary, computer memory. These descriptions of longer term and shorter term memory types will be used interchangeably herein. Where one term is used, it may be substituted with any other term in the corresponding memory category (where the categories comprise longer term and shorter term).

In the context of 3D printing, the seed image may comprise data representing the appearance or shape of an object to be generated. A rasterised image for 3D printing may be described in terms of 'voxels', i.e. 3D pixels, which may be associated with properties and/or materials (for example, print agents to produce colors and the like, and/or build materials which are to be solidified to form an object), or in some other way.

Figure 1:
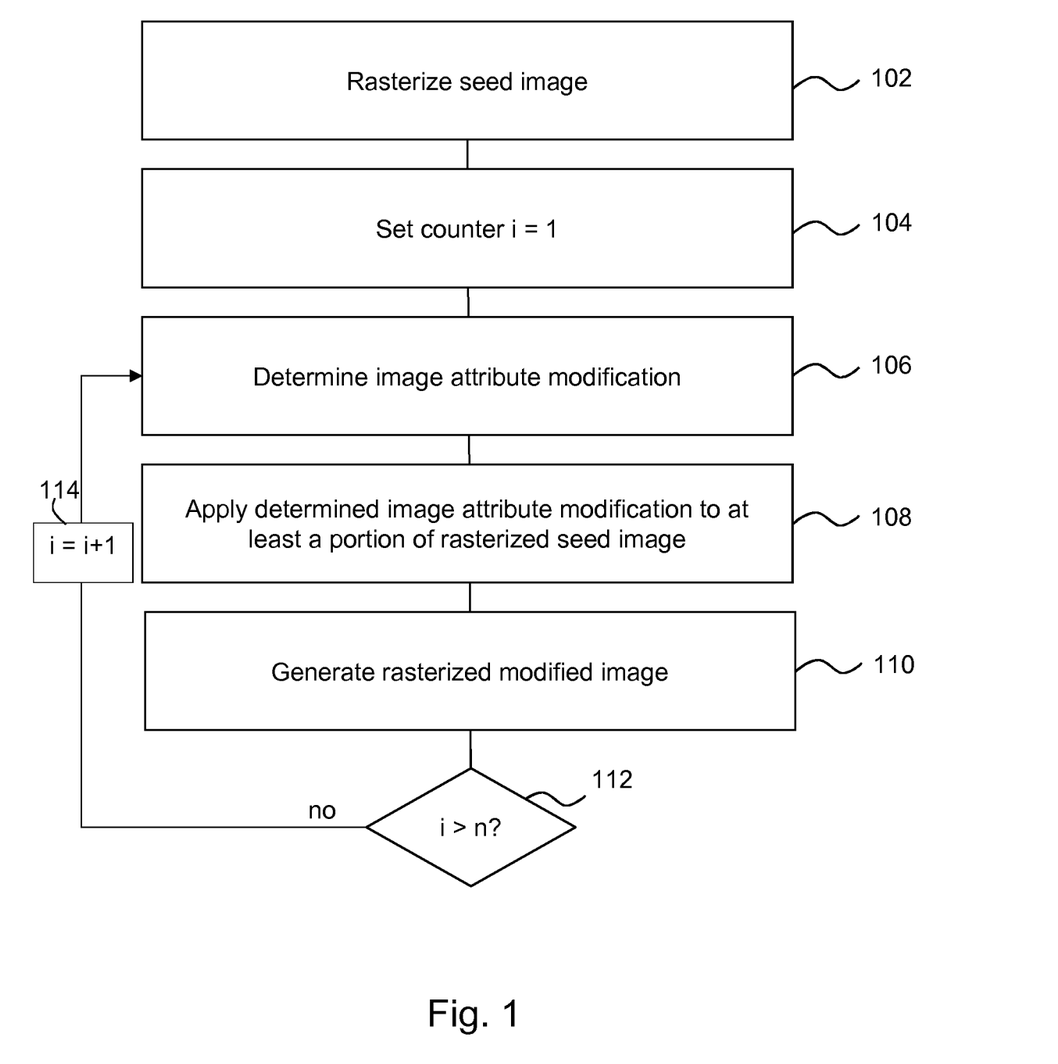
FIG. 1 shows an example of a method for generating a plurality of rasterized modified images.

FIG. 1 is an example of a method, which may be a computer implemented method, and may be a method for generating a plurality of modified images based on at least part of a (single) seed image. The method may be carried out using at least one processor. The method comprises, in block 102, rasterizing a seed image, which may for example comprise retrieving it from secondary computer memory. In other examples, the rasterized seed image may be received over any communications link, for example having been generated remotely and sent over a network. In some examples, the rasterized seed image comprises a plurality of separations. In other examples, a single separation is provided.

Block 104 comprises setting a counter i=1. In this example, n modified images are to be created and the counter will count from 1 to n.

Generating each rasterized modified image comprises, in block 106, determining an image attribute modification. For example, the modification may comprise any, or any combination of, cropping (i.e. selecting a portion of a seed image), a degree of magnification (or zooming), a degree of rotation, reflection, distortion or skewing, modification of colorization and/or of transparency in the seed image, or the like.

In some examples, the image attribute modification may be determined on-the-fly, for example, being a random or pseudo-random modification of the seed image. For example, an index (which may be related to the counter value) may be input into a pseudo-random number generator, and an output number may be used to indicate one or more modifications to be applied. In other examples, the image attribute modifications may be predetermined, for example being held in a memory or the like. For example, there may be a set of available predefined image modification attributes, which may, in some examples, depend on an image seed, and/or a set of predetermined rules or the like.

For each modification attribute, there may be a range of possible values. For example, where the modification attribute is the amount of zooming, there may be a maximum zoom and a minimum zoom, giving a maximum size and a minimum size of the resultant modified image. Where the modification attribute is the amount of distortion, there may be a maximum amount and a minimum amount, giving maximally and minimally distorted modified images. In some examples, the range may be selectable. For example, a user may select the full range of possible values to be available, or may select a subset of the possible values from the range.

Block 108 comprises applying the determined image attribute modification to at least a portion of the rasterized seed image (where the portion may be selected by cropping as described above). While a plurality of modified images could be created based on the seed image in its entirety, selecting different portions of the seed image may increase the variety between the modified images. In some examples, block 108 may comprise applying image attribute modifications to each of a plurality of separations.

Block 110 comprises generating a rasterized modified image (which may comprise a plurality of separations). In block 112, it is determined whether the counter has reached n and if so, the method may terminate. If not, in block 114, the counter is incremented by 1, and the method returns to block 106. The image attribute modification to be applied differs between iterations to produce different modified images.

As this image is 'pre-rasterized', any pre-processing carried out for printing the image will be accordingly reduced as a rasterization process is not part of such pre-processing. This may be compared with preparing an un-rasterized modified image (for example a vector graphics format image), which will be sent to appropriate storage (e.g., implying non-volatile or secondary computer memory use) and subsequent rasterization will be carried out.

This can result in significant resource savings. For example, where the images are created in vector form or the like, these may consume significant amounts of memory resources, transmission resources and the like, and then significant additional processing resource in the rasterization thereof.

Figure 2:
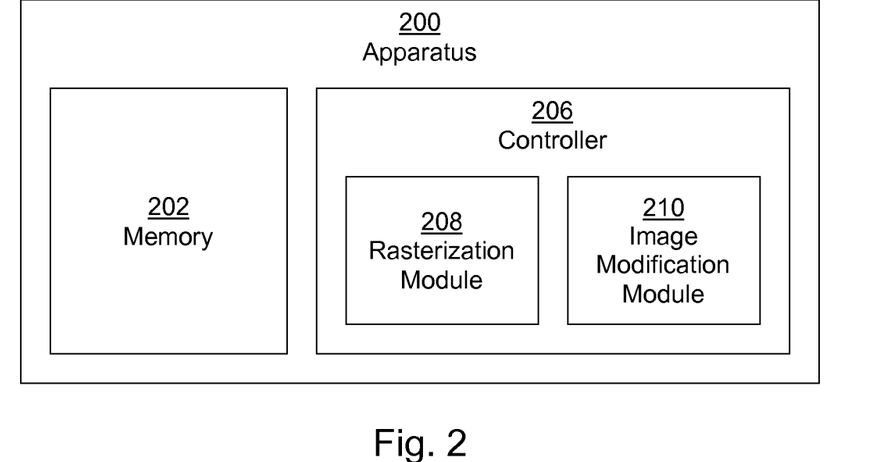
FIG. 2 shows an example of an apparatus comprising a controller.

FIG. 2 shows an example of apparatus 200 comprising a memory 202 and a controller 206. The controller 206, which may comprise processing circuitry, comprises a rasterization module 208 and an image modification module 210. In use of the apparatus 200, the rasterization module 208 is to rasterize a seed image and the image modification module 210 is to, for each of a plurality of differently modified rasterized images: (i) determine an image attribute modification to be performed on at least a portion of the rasterized seed image, (ii) apply the image attribute modification to generate a rasterized modified image and (iii) store the rasterized modified image in the memory 202. In some examples, the memory 202 may comprise volatile memory.

Figure 3:
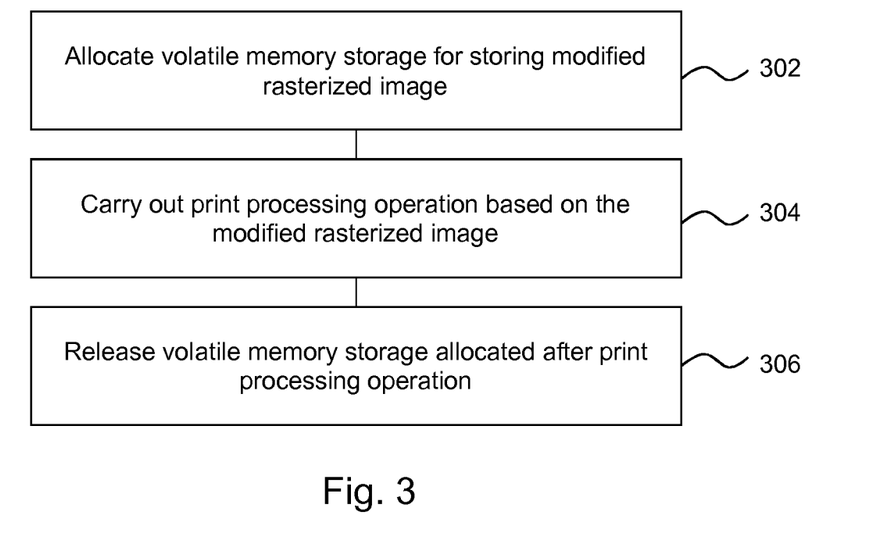
FIG. 3 shows an example of memory use in a method for generating a plurality of rasterized modified images.

An example of a method which may be performed by the controller 206 is described with reference to FIG. 3.

In block 302, volatile memory storage is allocated for storing a modified rasterized image in volatile memory. This may comprise storing the modified rasterized image in volatile memory in a volatile memory portion of the memory 202, for example in a manner which is at least temporarily protected from overwriting. In block 304, at least part of a print processing operation based on the modified rasterized image is carried out. In block 306, after at least part of the print processing operation is carried out (and in some examples after printing of the modified image is complete), the volatile memory storage allocated for storing the modified rasterized images is released. This means that the data may be overwritten (although as the memory may be addressed randomly, this may not happen immediately). In some examples, the released volatile memory storage is then accessible for allocation for storage of another of the modified rasterized images generated from the seed image.

Thus, in this example, volatile memory is reserved for storage of a modified rasterized image for as long as a print processing operation based on the image data is to be carried out, prior to being released.

In one example, the print processing operation comprises compiling a composite page in a print-ready format. A print ready format may be used for print and preview operations.

In building a composite page (and as is further described below in relation to FIG. 4), some image elements may be variable (for example, comprising a modification of the seed image) and some image elements may be consistent between printed images. The rasterised versions of these image elements may be stored in volatile memory for as long as they are needed (for example, consistent elements may be retained throughout a print run job, whereas the memory allocated to variable image elements may be recycled throughout the print run. The composed page may be retained in volatile memory, which may be a memory of the printer itself, until it is 'consumed' or processed by the printer.

In another example, the print processing operation comprises printing at least part of the modified image. This may comprise a printing a separation, or a leading portion of a separation.

This therefore efficiently recycles the memory allocation. Moreover, use of volatile rather than non-volatile memory may result in an increase in processing speed. Examples of image attribute modifications which may be applied are now discussed with reference to FIG. 4.

Figure 4:
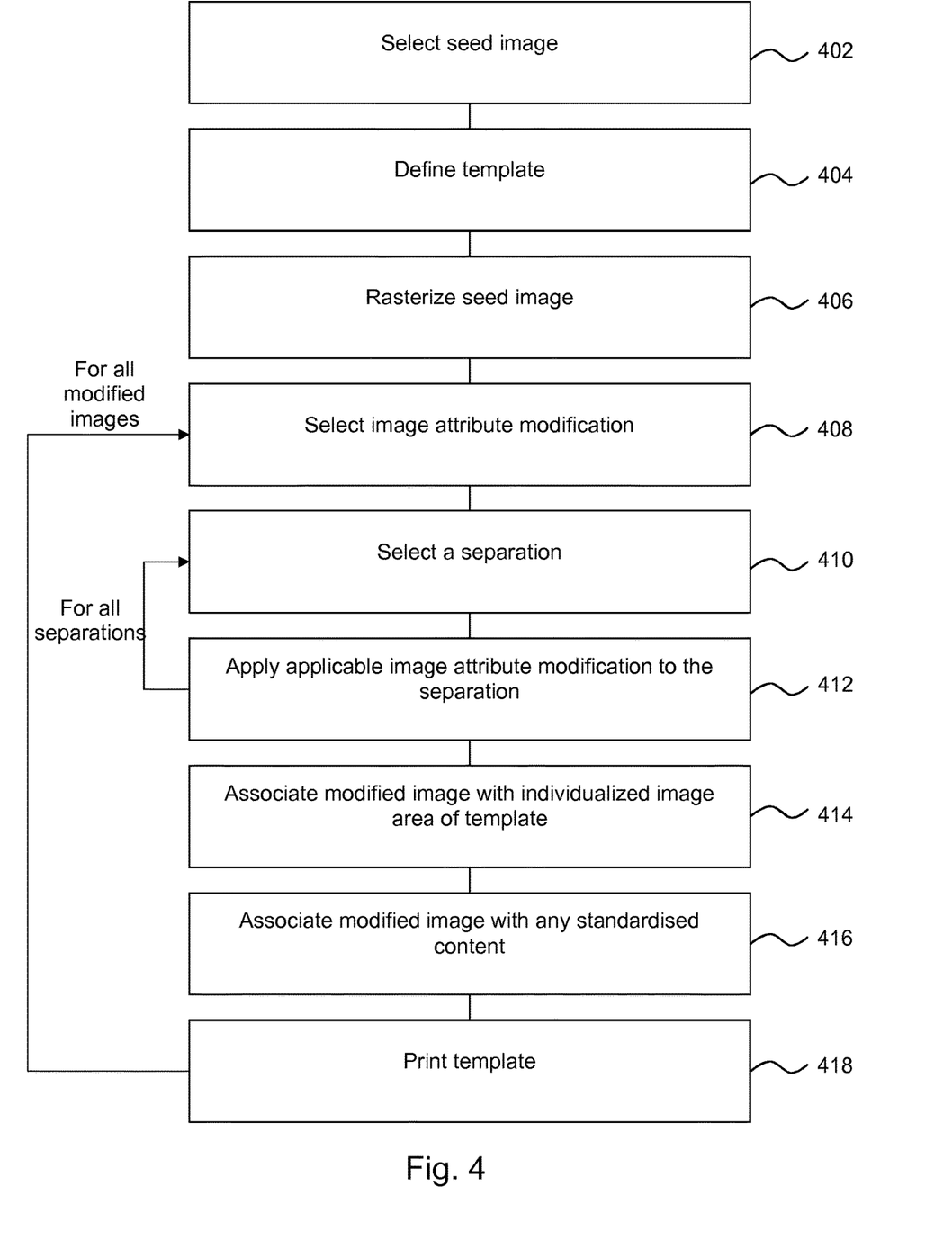
FIG. 4 shows an example of a method for generating and printing a plurality of rasterized modified images.

Block 402 comprises selecting a seed image. In some examples, this may be selected from a plurality of available seed images which may or may not have a degree of commonality between the designs. Providing a plurality of seed images allows for greater variety in the modified images. The seed image in this example is selected from persistent memory (which may for example be described as non-volatile, or secondary memory).

Block 404 comprises defining a template, which may for example be a template of a document or package design, which comprises at least one individualized image area. The template may also comprise a standard image area, which is to be present in each of a plurality of modified images. For example, this may comprise text, a logo, or the like. In some examples, the individualized image area and the standard image area may overlie one another. For example, a logo and product information may overlie a varying background such that the background may differ while the logo and product information remains consistent such that different products may have different packaging which conveys information in a consistent manner.

In block 406, the seed image is rasterized, which in this example comprises providing a plurality of rasterised separations.

To briefly describe different examples of separations, an image may be made up of a plurality of colorants, such that dots of the colorants combine in the human eye to produce particular colors. For example, print apparatus may comprise a set of CMYK or Cyan Magenta Yellow and Black (key) colorants. The placement of each colorant may be defined individually within an associated separation, and image areas may be associated with grey levels indicating the coverage of the associated colorant in that region.

In addition, in some examples herein, the separation may be a spot color separation. A spot color is a predetermined color, which may in some examples be provided as a dedicated premixed colorant. For example, a company logo may be associated with a particular color. In order to assure color consistency, a premixed ink or toner having such a color may be provided in a printer. However, in principle, any color may be designated as a spot color by providing a complete specification of this color, and may be reproduced in print for example by applying the premixed ink or by emulating the color using standard process colorants (e.g. CMYK colorants). In an example, there may be a number of defined spot colors for use in a particular print run.

Separations may usually be associated with a specification of coverage of the particular colorant. For example, this may be a greyscale or grey level value which varies over the image depending on how much of that colorant is to be applied in a particular image region. In this example however, the spot color separation is defined to have N+1 levels, where N is the number of spot colors and the levels correspond to individual spot colors with one level being dedicated to the absence of spot colors. As set out in greater detail below, color shuffling may be performed on such spot color separations.

A further example of a separation which may be utilised in some examples is at least one separation to represent transparencies and semi transparencies. In some examples, this may be referred to as an alpha channel, and may be created in the rasterizing process. Such separations may for example designate pixels as being at least partially transparent in addition to having a color.

Block 408 comprises selecting an image attribute modification. In this example, a plurality of image attribute modifications are predetermined, each being stored in non-volatile memory as an indexed data file. The image attribute modification may specify any, or any combination of cropping (which may comprise defining a sub portion of the seed image which may be further modified), rotating, translating, distorting, scaling, color shuffling, colorization, applying transparency effects, reflecting, color depth variations, brightness and contrast, gamma correction, histogram equalization and manipulation, warping, filtering, or any other image processing technique.

In some examples, selecting an image attribute modification may comprise selecting an index, which may be the next in a series of indexed data files. In other examples, an indexed data file may be selected randomly or pseudo-randomly. In some examples, selecting an image attribute modification may comprise generating an image attribute modification. This may for example comprise providing an input to a pseudo-random number generator with the output pseudo-random number being used to determine image attribute modifications to apply. In other examples, a true random number generator may be used (although this may mean that duplicate modifications are specified). It may be noted that, even when an indexed data file may be selected randomly or pseudo-randomly, the same indexed data file will result in the same transformation, so the modification is repeatable should this be intended in particular circumstance.

In some examples, there may be a set of rules which may be used, for example in conjunction with other methods set out herein, to specify or select modifications to be applied to a seed image.

Block 410 comprises selecting a separation, which may be any separation created by the rasterizing process. Thus, in this example, the image modification is carried out on each separation separately (however this may not be the case in all examples).

Block 412 comprises applying applicable image attribute modification to the separation. However, it may be the case that some modifications are not carried out on all separations of the seed image.

In some examples, the same image attribute modification is carried out on each of a plurality of separations. For example, the same crop may be performed for all separations. Performing a crop in effect comprises selecting a portion of the seed image on which the modified image will be based. While the modified images could be based on the seed image as a whole, selecting a variable portion of the seed image allows for greater variety in the modified images. The portion of the seed image selected may in some examples fill the individualized image area of the template although, as in some examples a rasterized modified image may be scaled, the selected portion may be a different size to the individualized image area.

In other examples, the image attribute modification may comprise performing a rotation of a selected rasterized seed image portion; translating, distorting, and/or scaling this portion, or the like, and this may be performed on all separations.

Thus, in some examples, at least some image modifications are applied to each of the separations, or at least a portion thereof. However, in some examples (or in the case of certain modifications), the image attribute modification may be carried out on some separations and not on others. For example, color shuffling may be carried out in relation to a color spot separation and not in relation to other separations.

To consider color shuffling in greater detail, if the image contains a spot color separation and the image attribute modification comprises color shuffling, this may comprise color shuffling of spot colors. For example, the image modification attributes may include a "color shuffling dictionary" that assigns a specific combination of process colors to each of the N spot colors in the seed image. Each spot color identified by a level in the seed image may be replaced by the corresponding combination of process colors according to the "color shuffling dictionary". The modified image may be created from the basic process colors where the spot color separation indicates no shuffling, and with new process color combinations for each of the pixels defined in the spot color separation as one of the N spot colors to be shuffled. Thus, in the absence of any other modification, the same design element may appear in multiple modified images but may have a different color in each of those images. In the context of 3D printing, color shuffling may for example change the association between object portions and specified colors (and recoloring may comprise recoloring selected object portions, for example having defined shapes)

An alpha channel separation describing transparencies may be attached to each of the modified images, and may in some examples vary between modified images following the same rules of attribute modifications. In other examples, the alpha channel separation may be consistent (i.e. not subject to modification between modified images). In still further examples, the alpha channel may be created using a mathematical function that combines two of more alpha channel separations into a single one thus allowing both modified and consistent data to determine the shape and appearance of the output image. For example, a consistent alpha channel may restrain the composition of the modified image such that it fills a particular shape, e.g. a round shape, while a variable alpha channel may be modified using techniques set out herein to create a variable image inside the round shape.

As indicated by the looping arrow, blocks 410 and 412 may be carried out for each defined separation. Once all separations have been modified to the appropriate extent, the modified image is defined, in this example by the plurality of modified separations.

In block 414, the modified image is associated with the individualized image area of the template and, in block 416, the modified image is associated with any standardised content.

This in effect results in a composite image being defined, which comprises the modified separations and any additional standardised content which is to be same in a plurality of output images.

Block 418 comprises printing the modified image corresponding to different separations of the seed image to form a modified output image, and the method then repeats from block 408 such that a plurality of modified images are printed based on the same rasterized seed image. In examples relating to 3D printing, printing the modified image may comprise generating an object.

In some examples, block 418 is carried out as part of a print run for printing each of a plurality of modified images, to which different modifications have been applied, and at least partially concurrently with blocks 408 to 416 operating with a different image attribute modification selection, or on a different separation (i.e. in some examples, the processing of one separation may be carried out during printing of a previous separation). In some examples, it may be the case that while the leading portions of an image are being printed, trailing portions are still being processed in preparation for printing. In other examples, rasterized modified images may be stored in a queue, which may be held in volatile or primary memory (which may be RAM), for example until all the separations associated with a particular composite modified image have been defined.

In this example, therefore, a plurality of modified images may be defined using one seed image and a plurality of image attribute modification specifications. Where the image attribute modifications are stored as individual data blocks (for example, as entries in a database) or files, the blocks/files may be relatively small, for example comprising a few bytes in memory. Thus the memory storage dedicated to the plurality of modified images may be small prior to their generation and, in particular if the method of FIG. 3 is utilised, the memory may be recycled such that the overall memory resource is small both in terms of long term (non-volatile, or secondary memory) and short term (e.g. volatile memory, primary memory and/or RAM), while a print run may produce a run of images.

Figure 5:
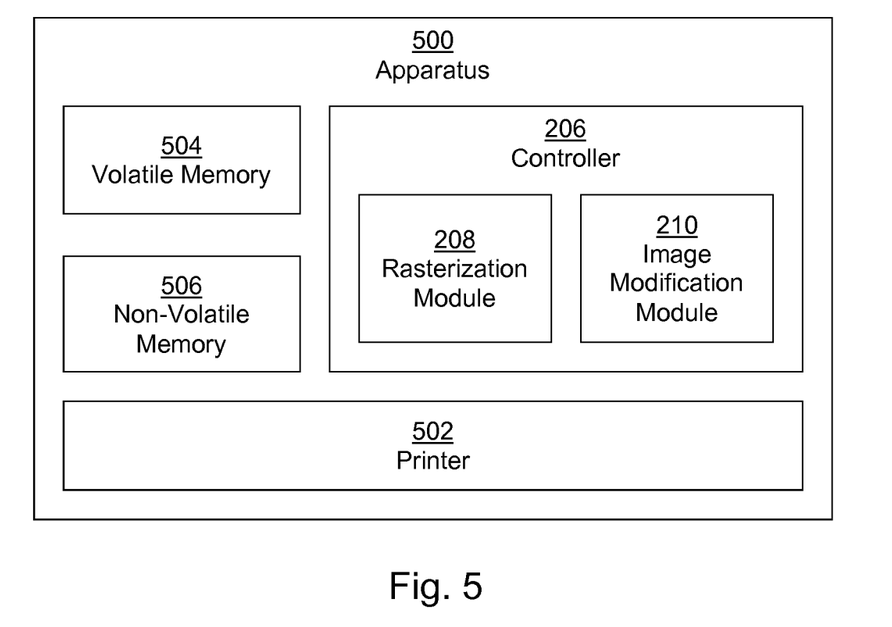
FIG. 5 shows an example print apparatus.

FIG. 5 is an example of an apparatus 500 comprising a printer 502, and memory comprising in this example volatile memory 504 and non-volatile memory 506, as well as the controller 206 of FIG. 2. The controller 206, in use of the apparatus 500 is to control the printer to print the modified image, for example as set out in the methods of FIG. 1, 3 or 4. The seed image may be stored in the non-volatile memory 506. Rasterised images may be stored in the volatile memory 506.

Although not shown herein, apparatus 500 may also comprise additional print apparatus components, for example print agent application unit(s), charging unit(s) for charging a photoconductive surface, an Intermediate transfer member (ITM) which may receive an image from the photoconductive surface before transferring this image to a substrate, substrate handling apparatus, print agents curing or drying apparatus, printheads, laser arrays, and the like, which may depend on the type of printer provided.

Figure 6:
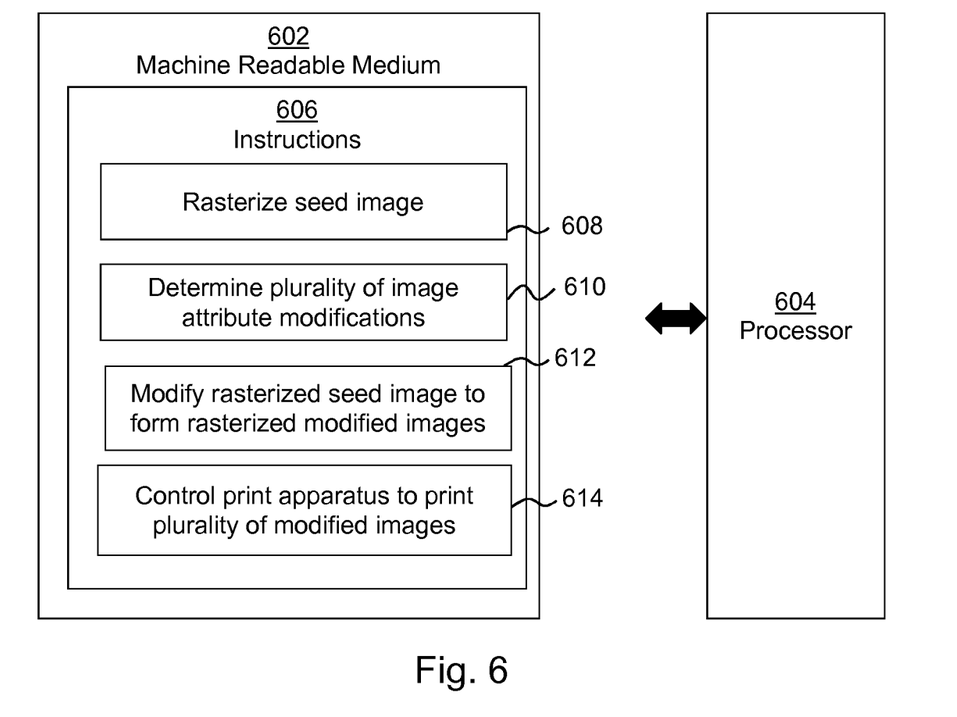
FIG. 6 shows an example of a machine readable medium in association with a processor.

FIG. 6 is an example of a tangible (and non-transitory) machine readable medium 602 in association with a processor 604. The tangible machine readable medium 602 comprises instructions 606 which, when executed by the processor 604, cause the processor 604 to carry out a plurality of tasks. The instructions 606 comprise instructions 608 to cause the processor 604 to rasterize a seed image; instructions 610 to cause the processor 604 to determine a plurality of image attribute modifications; instructions 612 to cause the processor 604 to modify the rasterized seed image based on the plurality of determined image attribute modifications to form a plurality of rasterized modified images outputs; and instructions 614 to cause the processor 604 to control print apparatus to print the plurality of modified images based on the plurality of rasterized modified image outputs. The image outputs may comprise whole or partial images, or whole or partial separations The instructions 606-614 are arranged such that modifying the rasterized seed image based on the plurality of determined image attribute modifications is performed at least partially concurrently with printing at least one previously formed modified image output (e.g. a previous separation, image, or part thereof).

Aspects of some examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least one flow in the flow charts, as well as combinations of the flows in the flow charts, can be realized by machine readable instructions.

The machine readable instructions may, for example, be executed by a general purpose computer, a special purpose computer, an embedded processor or processors of other programmable data processing devices to realize the functions described in the description and diagrams, and which may for example comprise at least part of the controller 206. In some examples, the controller 206 may be embodied as a graphics processing unit (GPU). In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims and/or other dependent claim(s).

The invention claimed is:

1. A method comprising:
    rasterizing, by a processor, a seed image; and
    generating, by the processor, a plurality of rasterized modified images from the rasterized seed image, where generating each rasterized modified image comprises:
        determining an image attribute modification; and
        applying, by the processor, the determined image attribute modification to at least one portion of the rasterized seed image to generate the rasterized modified image,
    wherein the rasterizedseed image comprises a plurality of separations, and wherein the plurality of separations comprise spot color separations associated with N+1 levels, where N is a number of spot colors in the rasterized seed image and one level corresponds to an absence of a spot color, and each of the N levels corresponds to a specific spot color.

2. A method as claimed in claim 1, further comprising:
    allocating volatile memory storage for storing each rasterized modified image in volatile memory until a print processing operation of the stored rasterized modified image is carried out.

3. A method as claimed in claim 2, wherein the allocated volatile memory storage is accessible for storing another rasterized modified image after the print processing operation of the stored modified rasterized image is carried out.

4. A method as claimed in claim 1, further comprising:
    printing the plurality of rasterized modified images, wherein a generation of a next rasterized modified image to be printed is carried out during printing of a previously generated rasterized modified image.

5. A method as claimed in claim 1, further comprising:
    defining a template, comprising at least one individualized image area, associating each rasterized modified image with the template, and applying the modified rasterized image to the at least one individualized image area.

6. A method as claimed in claim 1, the method further comprising applying the determined image attribute modification separately to each of the plurality of separations.

7. A method as claimed in claim 1,
    wherein determining the image attribute modification comprises color shuffling, wherein the color shuffling comprises selecting a different colorant combination for each of the N+1 levels specified in the spot color separation.

8. A method as claimed in claim 1, wherein applying the determined image attribute modification comprises applying at least one of the following modifications to the rasterized seed image: cropping, rotating, translating, distorting, scaling, color shuffling, colorization, applying transparency effects, reflecting, color depth variations, brightness adjustment, contrast adjustment, gamma correction, histogram equalization and manipulation, warping, and filtering.

9. A method as claimed in claim 1, wherein rasterizing the seed image comprises creating separations, wherein at least one separation corresponds to a color of print agent and at least another separation corresponds to a transparency value.

10. A method as claimed in claim 1, further comprising:
    printing an image of the plurality of rasterized modified images at least partially concurrently with applying the determined image attribute modification to the at least one portion of the rasterized seed image.

11. A method as claimed in claim 1, comprising receiving the seed image from a persistent memory.

12. A method as claimed in claim 1, wherein determining the image attribute modification comprises a random or pseudo-random process.

13. Apparatus, comprising:
    a memory; and
    a controller comprising:
        a rasterization module to rasterize a seed image; and
        an image modification module to generate a plurality of rasterized modified images from the rasterized seed image, wherein, to generate each rasterized modified image, the image modification module is to:
            determine an image attribute modification to be performed on at least one portion of the rasterized seed image;
            apply the image attribute modification to generate the rasterized modified image; and
            store the rasterized modified image in the memory,
        wherein the rasterized seed image comprises a plurality of separations, wherein the plurality of separations comprise spot color separations associated with N+1 levels, where N is a number of spot colors in the rasterized seed image and one level corresponds to an absence of a spot color, and each of the N levels corresponds to a specific spot color.

14. An apparatus as claimed in claim 13, further comprising a printer, wherein the controller is to control the printer to print the plurality of rasterized modified images.

15. A non-transitory machine-readable storage medium storing instructions executable by a processor to cause the processor to:
    rasterize a seed image;
    determine a plurality of image attribute modifications;
    modify the rasterized seed image based on the plurality of determined image attribute modifications to generate a plurality of rasterized modified image outputs, wherein to generate each rasterized modified image output, the instructions cause the processor to: determine an image attribute modification, and apply the determined image attribute modification on at least one portion of the rasterized seed image to generate the rasterized modified image output; and control a print apparatus to print a plurality of modified images based on the plurality of rasterized modified image outputs, wherein the processor is to modify the rasterized seed image based on the plurality of determined image attribute modifications concurrently with controlling the print apparatus to print a formed rasterized modified image output, wherein the rasterized seed image comprises a plurality of separations, and wherein the plurality of separations comprise spot color separations associated with N+1 levels, where T is a number of spot colors in the rasterized seed image and one level corresponds to an absence of a spot color, and each of the N levels corresponds to a specific spot color.

16. A non-transitory machine-readable storage medium as claimed in claim 15, wherein the instructions are executable cause the processor to:

apply each of the plurality of determined image attribute modifications separately to each of the plurality of separations of the rasterized seed image, including color shuffling to select a different colorant combination for each of the N+1 levels specified in the spot color separations.

17. An apparatus as claimed in claim 13, wherein the instructions are executable cause the processor to:

apply the determined image attribute modification separately to each of the plurality of separations of the rasterized seed image, including color shuffling to select a different colorant combination for each of the N+1 levels specified in the spot color separations.

* * * * *